Sept. 11, 1951  C. W. WATSON  2,567,259
CATALYTIC CONVERSION WITH A FLUIDIZED SOLID CATALYST
Filed March 7, 1946
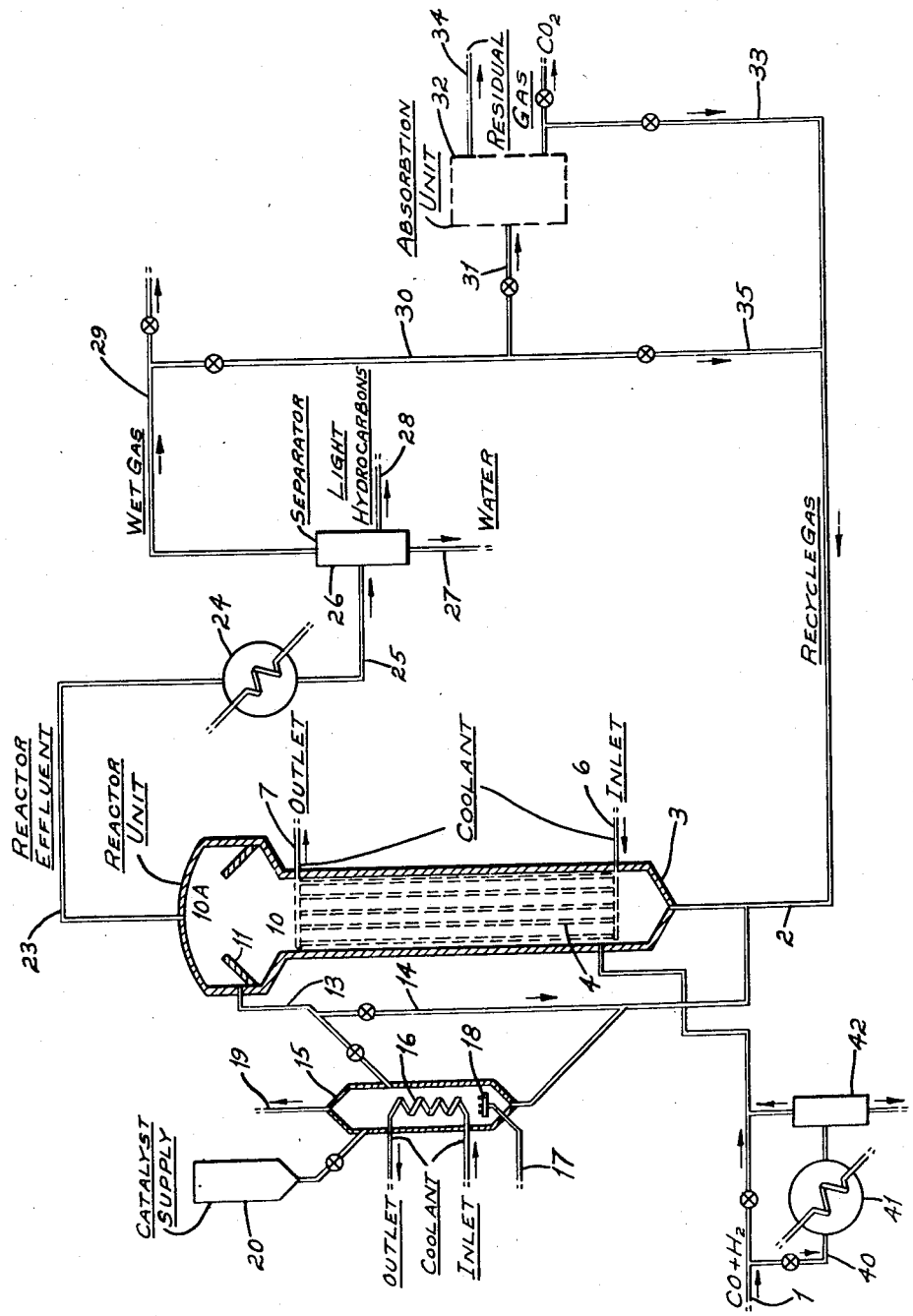
INVENTOR
CLAUDE W. WATSON
BY HIS ATTORNEY Patented Sept. 11, 1951

2,567,259

UNITED STATES PATENT OFFICE 2,567,259

CATALYTIC CONVERSION WITH A
FLUIDIZED SOLID CATALYST

Claude W. Watson, Scarsdale, N. Y., assignor to
The Texas Company, New York, N. Y., a corporation of Delaware Application March 7, 1946, Serial No. 652,834

6 Claims. (Cl. 260—449)

This invention relates to a method of effecting catalytic conversions with a fluidized catalyst in solid particle form.

The invention contemplates effecting conversion of gaseous reactants during flow through vertical reaction passages or channels of constricted cross-sectional area in contact with a fluidized catalytic mass comprising catalyst particles in relatively finely-divided form or in the form of dust, and relatively coarse dispersing particles of solid material and preferably inert, such as quartz, Alundum, or metals unaffected by the reactants. The reaction passages may be in the form of tubes, or other suitable surfaces within a reaction vessel, the surfaces preferably being cooling surfaces in the case of a highly exothermic reaction.

The catalyst particles are those obtainable by fine grinding such that at least 90% by volume of the catalyst consists of particles having a diameter not larger than 0.1, and preferably not larger than 0.001 times the average diameter of the dispersing particles. The dispersing particles are of such size as to be maintained in vibratory motion with limited circulation of the dispersing particles. The dispersing particles are of uniform size and shape and have a particle diameter within the range of about 0.05 to 0.35, and preferably 0.1 to 0.2 times the diameter of a tube having an hydraulic radius equal to that of the reaction passage or channel in which the catalyst fluidization is being effected. These relationships are critical from the standpoint of realizing effective contact between catalyst and reactants and uniformity of catalyst particle temperature within the reaction zone.

It is desirable to employ dispersing particles affording a maximum of free space, preferably in excess of about 60%. These particles may be spherical, although it is contemplated that they may be in the form of cylinders, Raschig rings, Berl saddles, etc. so as to afford a maximum of free space. The void spaces between dispersing particles are substantially completely filled with the catalyst powder.

The invention is of particular application with respect to exothermic reactions wherein provision is made for effectively removing from the reaction zone heat liberated by the reaction, although it is also useful for endothermic reactions. By means of this invention a uniformly high rate of heat transfer is realized between individual catalyst particles and adjacent heat exchange surfaces within the reaction vessel. The invention is therefore particularly useful in effecting the catalytic conversion of carbon monoxide and hydrogen into higher molecular weight compounds, including hydrocarbons, oxygenated hydrocarbons and the like.

In accordance with the invention, a fluidizable mass of catalyst powder and inert dispersing particles is disposed within a vertical reaction vessel or vessels in direct physical contact with cooling surfaces positioned therein. A stream of reactant gas containing carbon monoxide and hydrogen is continuously introduced to the lower portion of the reaction vessel and to succeeding points, if necessary, and caused to pass upwardly through the fluidized mass of particles under conditions such as to maintain the mass in a state of substantially uniform fluidization along the vertical dimension of the reaction vessel. Advantageously, conditions are employed such that the mass of solid particles simulates a boiling liquid. The products of reaction, including unreacted gas, are drawn off as an effluent stream from the upper portion of the reaction zone, provision being made for removal of entrained solids, as will be described later.

As a result of entrainment, catalyst powder accumulates in the uppermost portion of the reaction zone, and therefore provision is made for recirculation of accumulated powder to the lower portion of the reaction vessel.

It has been observed that in the conventional application of fluidized solid catalyst technique the gas or vapor passes through the reactor largely in the form of large "bubbles." The catalyst moves upwardly en masse within the reactor in the form of "slugs" and since the dense phase volume is substantially constant the catalyst also moves downwardly largely en masse in the form of slugs. Under these conditions the contact between vapor and catalyst is not good.

Moreover, there is wide deviation in temperature between individual catalyst particles. Some particles may be at temperatures 100° F. or more above the indicated reactor temperature. Consequently with elevated reactor temperature in the range above 500° F. and particularly with an iron type of catalyst, reactions of carbon forming nature occur so that the catalyst rapidly becomes fouled with carbon and carbonaceous deposits.

The present invention permits material improvement in this contact by providing effective dispersion of gas or vapor through the catalyst mass. This desired dispersion is achieved by employing a particle size distribution such that the reactor is substantially filled with coarse particles which will have a lesser tendency to move upwardly at the velocity of the vapor. The coarse particles thus serve as the dispersing medium. The desired contact between vapor and catalyst is achieved by inclusion of the catalyst in the form of very fine particles in an amount such as to substantially completely fill the voids within the mass of dispersing particles.

The fine catalyst particles move substantially with the velocity of the gas or vapor until impact with the dispersing particles upon which their direction of flow changes, resulting in improved contact with the reactants. The fine catalyst particles move upwardly at a much greater rate than the coarse dispersing particles and escape from the dense phase. They thus tend to accumulate in the top or upper portion of the vessel and therefore provision must be made for their return to the bottom of the vessel. Conditions are maintained such that there is a high degree of slippage between vapor and fluidized dispersing particles. Consequently the proportion of dispersing particles to catalyst particles entrained in the effluent vapor rising from the reaction zone is relatively small but sufficient to insure fluidization of the dispersing particles along the vertical dimension of the reaction zone.

The coarse dispersing particles are carefully sized since void space is a maximum when the coarse particles are of a uniform shape and size. In order to have the maximum catalyst bed density the fine catalyst particles must be very small in comparison with the coarse dispersing particles. I find that high bed density is realized when the ratio of the diameter of the fine catalyst particles to the diameter of the coarse dispersing particles is in the order of 0.001 or less.

In the catalytic conversion of carbon monoxide and hydrogen at elevated temperatures, as for example in the range 500° F. and above, with an iron type of catalyst disintegration of catalyst particles takes place as a result of the formation of elemental or possibly higher carbides within the catalyst particle. This causes the particle to spall with an accompanying diminution in particle size. Therefore, and in accordance with the present invention, it is advantageous to employ dispersing particles formed from substantially inert material, examples of which have already been mentioned. The object in employing inert material is to avoid disintegration and diminution in dispersing particle size during continued use.

According to the present invention, the catalyst particles initially are in a state of fine subdivision, and while these particles may undergo substantial diminution in particle size during continued use, this is not objectionable, and in fact is advantageous from the standpoint of facilitating recirculation of the fine catalyst to the bottom of the reactor so as to maintain the desired high catalyst bed density with resultant improvement in contact between reactants and catalyst.

High bed density is also advantageous from the standpoint of realizing a high rate of heat transfer between individual solid particles and the adjacent cooling or heat exchange surface. Dispersing particles are preferably formed of material having a high heat conductivity thereby facilitating heat transfer from individual catalyst particles to the adjacent heat exchange surfaces.

It will be understood, of course, that the velocity through the particle mass should be such that the coarse dispersing particles "jiggle" or are maintained in vibratory motion such that the existence of stagnant pockets of catalyst in the void spaces is avoided. Otherwise, the catalyst particles in such pockets would be heated excessively, giving rise to undesired reactions and excessive fouling of the catalyst.

From the standpoint of realizing rapid and effective removal of heat from a highly exothermic reaction such as the synthesis of hydrocarbons from carbon monoxide and hydrogen, it is preferred to apply the fluidized catalyst technique in reaction zones of tubular character affording a maximum surface to volume ratio. It is contemplated employing reaction passages having a hydraulic radius in the range of that of tubes having a diameter not greater than about 4 inches, and preferably 2 inches or less.

An effective reactor advantageously comprises a vertical vessel containing a plurality of tubular elements. The construction may be such that the heat carrier fluid flows within the tubes in which case the fluidized solids are maintained in spaces between tubes and out of direct contact with the carrier fluid, which spaces are in effect continuously interconnected vertical passages or zones wherein the catalytic reaction is effected as the reactants rise therethrough. Instead, the tubes may be set vertically in suitable tube sheets to permit flow of the heat carrier fluid over the exterior surfaces while the fluidized solids are maintained within the tubes.

The hydraulic radius of a tube is taken as the internal cross-sectional area of the tube divided by its wetted perimeter. The hydraulic radius of a cylindrical tube is thus equal to its diameter divided by 4 so that the hydraulic radius of a 4 inch tube for example is 1 inch. In the case of a reaction vessel containing a plurality of vertical cooling tubes with the fluidized catalyst reaction being effected in the spaces between tubes, the hydraulic radius of the reactor is regarded as the net internal area of the vessel (the internal cross-sectional area of the vessel less the sum of the external cross-sectional areas of the tubes) divided by the sum of the internal perimeter of the vessel and the tube external perimeters.

The relationship between particle diameter in inches and mesh size of the particles, using a Tyler sieve, is indicated in the following tabulation:

| Particle Diameter Inches | Mesh Size Opening |
|---|---|
| 0.40 | 2 |
| 0.30 | 2.5 |
| 0.20 | 3.5 |
| 0.10 | 7-8 |
| 0.05 | 12-14 |
| 0.01 | 60 |

When the particle is in the form of a cylinder or any other shape it should be related to a sphere having the same gross surface area in which case the effective diameter of the particle is that corresponding to a sphere having the same gross surface area.

Reference will now be made to the accompanying drawing which describes the application of the invention to the catalytic conversion of carbon monoxide and hydrogen into hydrocarbons by contact with fluidized catalyst powder in a reaction vessel containing a plurality of vertical cooling tubes for removing exothermic heat of reaction.

As indicated in the drawing, synthesis gas containing carbon monoxide and hydrogen is drawn from a source not shown through a pipe 1 leading to the lower portion of a vessel 3. Advantageously, the synthesis gas contains at least about 2 mols of hydrogen per mol of carbon monoxide and preferably is substantially free from water or is no more than saturated with water at the temperature of the feed gas entering the reactor. The temperature of the entering gas is preferably atmospheric or slightly above.

The numeral 4 designates a tubular cooling element indicated in broken lines. This element may comprise a vertical tube bundle formed from tubes having a diameter of about 1½ to 2 inches and having a length of 16 feet or more for example. The spacing between adjacent tube walls may range from about 1½ to 2 inches.

The spaces between the cooling tubes within the reaction zone of vessel 3 are initially filled to the extent of about 75 to 90% with dispersing particles having a diameter of about .1 to .2 inch and formed from a catalytically inactive metal having a high heat conductivity. These dispersing particles should have a high density and may be of any suitable composition which will resist disintegration and abrasion during continued use. The void spaces between dispersing particles are maintained filled with catalyst powder obtainable by fine grinding having not more than 10% of the particles having a diameter of more than .001 times the diameter of the dispersing particles. The catalyst powder may comprise an iron type of catalyst containing about 0.1 to 0.5% potassium oxide and about 2 to 5% alumina.

It is contemplated that the catalyst powder may comprise about 25 to 60% of the volume of the reaction zone, which is that portion of the reactor through which the cooling tubes extend. The catalyst powder volume depends upon the volume of void spaces between dispersing particles.

The cooling tubes terminate in suitable ring type headers in the upper and lower portions respectively of the vessel 3. In operation, a cooling liquid such as water or diphenyl is drawn from a source not shown through a pipe 6, and introduced to the cooling tubes so as to rise therethrough. The effluent coolant is discharged through a pipe 7 and may be recycled after cooling. It is contemplated that the cooling element 4 may be of any suitable construction and may involve the so-called "bayonet type" in which the coolant is introduced to the bottom of each tube through an inner concentric tube.

The upper portion of the vessel 3 is enlarged to provide primary and secondary settling spaces 10 and 10A respectively. In the primary settling space separation of entrained dispersing particles from the rising stream of gas occurs. It is contemplated that during operation some 10 to 20% of the mass of dispersing particles initially charged to the reaction zone will be in this primary settling space, while a relatively small amount will pass beyond the primary settling space into the secondary space.

The gaseous and vaporous products of reaction, after passing through the primary settling space, still contain entrained catalyst powder and a relatively small amount of dispering particles. These gases and entrained catalyst then flow through the secondary settling space 10A. Suitable filter elements formed from porous refractory material, such as Alundum and not shown in the drawing may be provided in the upper portion of this secondary settling space.

The gaseous and vaporous products of reaction, including unreacted gas, pass through the pores of such filters while entrained catalyst powder is retained within the space 10A. A plurality of such filter elements may be employed with provision for periodic cleansing of the exterior surfaces of the filters to remove the fine particles that tend to accumulate thereon. It is contemplated that instead of or in addition to such filters, other means may be employed for separating entrained particles from the effluent gas, such as magnetic separating means.

As previously intimated, the solid particles entrained in the gas flowing into the space 10A comprise predominantly catalyst powder. Advantageously the arrangement is such that a substantial body of this catalyst powder accumulates above a baffle 11 in the space 10A. Provision is therefore made for continually withdrawing a portion of this accumulated catalyst powder through a conduit 13 leading to a standpipe 14, the lower end of which standpipe communicates with conduit 2 leading to the bottom of the vessel 3. The entering stream of recycle gas from a source later described, and aided by the static head of catalyst powder in the standpipe, forces the catalyst powder back into the bottom of the vessel 3. Suitable precautions, not shown, are taken so as to assure that the thus recycled catalyst powder is uniformly distributed over the cross section of the lower portion of the vessel 3. The recycled catalyst is introduced at a point substantially below that at which the fresh synthesis gas enters. It is preferred to introduce the fresh gas to the vessel 3 at a point immediately adjacent to, or just above, the bottom header of the cooling element 4.

It will be understood that other means may be employed for returning the catalyst powder to the bottom of the vessel 3. Return conduits may be provided within the reactor shell.

Also as indicated in the drawing, the recycled catalyst powder may be cooled prior to return to the vessel 3. In this case all or a portion thereof is directed from the conduit 13 into a vessel 15. In the vessel 15 the powder can be subjected to indirect contact with a suitable coolant flowing through an internal tubular cooling element 16. Direct contact cooling may be employed, if desired, in which case a liquid such as normal pentane may be drawn from a source not shown through a pipe 17 and injected into the lower portion of the vessel 15 through a spray 18. A plurality of atomizing sprays may be employed at successive points along the vertical dimension of the tower. As a result of contact with the hot catalyst powder the pentane is vaporized and escapes from the top of the vessel through a pipe 19. Similar provision may be made in the top of the vessel 15 for separating entrained powder from the effluent vapor. Also provision may be made for cooling and condensing the effluent vapor and recycling the condensate to effect cooling of further catalyst.

The cooling conditions in the vessel 15 may be regulated so as to reduce the temperature of the catalyst powder by some 25 to 100° F. below the temperature at which it is removed from the top of the reactor. Thus if the upper portion of the reaction zone is maintained at a temperature in the range of about 550 to 600° F. the withdrawn catalyst powder may be cooled to a temperature of about 300 to 500° F. prior to return to the bottom of the vessel. This is advantageous since it is desirable to effect initial contact between the synthesis feed gas and the catalyst at a temperature at least 10° F. lower than the temperature prevailing in the upper portion of the reactor. This initial contact temperature may be 50 to 100° F. lower than the temperature in the upper portion of the reactor.

The cooling of the catalyst powder in the vessel 15 by direct contact with a coolant in the manner disclosed may exert a beneficial action from the standpoint of removing contaminating material from the catalyst.

Catalyst make-up can be supplied to the system from a hopper 20.

The stream of effluent vapor containing hydrocarbon products and unreacted gas is continuously drawn off through a pipe 23 to a heat exchanger 24 wherein the stream is cooled to a temperature of about 100° F. The cooled stream then flows through a pipe 25 to a separator 26 wherein water and higher molecular weight hydrocarbons contained in the effluent are condensed, leaving a gaseous fraction comprising carbon dioxide, unreacted carbon monoxide and hydrogen, as well as hydrocarbons having from 1 to 5 carbon atoms per molecule.

The water which may contain some oxygenated compounds is drawn off through a pipe 27 while condensed hydrocarbons are drawn off through a pipe 28.

The gaseous fraction is conducted through a pipe 29 and may be discharged all or in part from the system. On the other hand, it is advantageous to pass this gaseous fraction through a pipe 30 and divert a major portion thereof through a pipe 31 to an adsorption unit 32. This portion of the gas is subjected to scrubbing with a liquid such as ethanolamine so as to adsorb carbon dioxide therefrom. The carbon dioxide is advantageously recycled through a pipe 33 and conduit 2 to the vessel 3.

The residual gas from the scrubbing operation comprising light hydrocarbons and some unreacted carbon monoxide and hydrogen is discharged through a pipe 34 and can be passed to fuel or to a polymerization operation, and may be treated to recover carbon monoxide and hydrogen, if desired.

The portion of the gas fraction not diverted through the pipe 31 may be passed through a pipe 35 to conduit 2 and in this way recycled to the reaction vessel 3.

The recycle gas is used to force the recycled catalyst powder, containing a trace of dispersing particles, into the reaction zone.

In operating for the maximum production of valuable olefinic hydrocarbons with a fluidized iron powder catalyst at a temperature of about 600° F. it is desirable to recycle a substantial quantity of carbon dioxide so as to suppress the net production of carbon dioxide as well as to materially reduce the production of methane.

It is advantageous to remove moisture from the entering feed gas and therefore provision may be made for diverting the synthesis gas flowing through pipe 1 through a branch pipe 40 and exchanger 41 wherein the gas is cooled to the desired temperature so as to condense water. The cooled gas is passed to a separator 42 wherein the condensed water is removed and the gas then returned to the pipe 1 for introduction to the conduit 2, as previously described.

Reaction zone pressures may range from atmospheric to 700 atmospheres. For the production of hydrocarbons with an iron catalyst, pressures of 150 to 200 pounds per square inch gauge are effective.

Space velocity of reactant gas flow through the vessel may range from 500 to 5000 volumes of gas (standard conditions) per hour per volume of reactor space occupied by fluidized catalyst. Linear velocity is maintained such that there is only limited entrainment of dispersing particles from the reaction zone. The content of the catalyst powder in the effluent stream above the reaction zone in the space 10A approximates that of the reactant gas stream entering the reaction vessel in order to maintain substantially uniform catalyst bed density along the vertical dimension of the reaction zone.

By maintaining the previously described particle size distribution and relationship of dispersing particle diameter to diameter of the reaction zone, slugging of the particle mass is avoided. The catalyst powder appears as a smoke of uniform density throughout the reaction zone with resulting improved contact between catalyst and reactants as well as avoidance of excessive catalyst particle temperatures. There thus results a material reduction in the rate of catalyst fouling or carbon formation upon the catalyst.

For example, when operating with a fluidized iron catalyst powder of about 0.004 inch particle diameter in a 4 inch diameter reaction tube substantially filled with fluidized dispersing particles of about 0.4 inch diameter at an average reaction temperature of about 600° F. for a given period of time, the amount of carbon picked up by the catalyst will not exceed 10% by weight of the catalyst. By contrast, when operating in the conventional manner with a fluidized mass consisting only of the catalyst powder, the amount of carbon picked up by the catalyst in the same period of time and with the same average reactor temperature will be at least 25% by weight of the catalyst. Reduction in the fouling of the catalyst with this carbon results in a corresponding increase in yield of hydrocarbons since carbon monoxide entering in the reactant gas is being converted to hydrocarbons rather than to carbon or carbonaceous deposits.

While an iron catalyst has been specifically mentioned as a synthesis catalyst, nevertheless, it is contemplated that the catalyst may comprise other metals of the iron group; namely, cobalt, ruthenium, etc. Other useful promoters may be employed with the metal such as the oxides of thorium, magnesium, uranium, and vanadium.

Supported catalysts may be used containing as supporting materials diatomaceous earth, silica gel, Filtrol, etc.

The conversion reaction temperature employed depends upon the nature of the catalyst and the type of product desired. The temperatures may range from 200 to 700° F. With an iron type catalyst it is advantageous to employ temperatures from 500 to 600° F. while with a cobalt catalyst an effective temperature ranges from 365 to 410° F. when producing products consisting mainly of hydrocarbons. The invention is useful for the production of compounds other than hydrocarbons, such as oxygenated compounds. It is applicable to other exothermic conversion reactions and is applicable to reactions of an endothermic nature.

Obviously many modifications and variations of the invention as above set forth may be made without departing from the spirit and scope thereof, and therefore only such limitations should be imposed as are indicated in the appended claims.

I claim:
1. In the catalytic conversion of the reactants hydrogen and carbon monoxide into compounds of higher molecular weight by contact with a solid particle catalyst, the improvement which comprises effecting said contact by passing a stream of said reactants upwardly through a reaction zone comprising a relatively constricted, vertically extending passageway having an hydraulic radius not greater than about one inch and occupied by a relatively coarse dispersing fraction, consisting of substantially inert solid particles of substantially uniform diameter within the range of about 0.05 to 0.35 times the diameter of a tube having an hydraulic radius equal to that of said reaction zone, and a relatively fine catalytic fraction, consisting of catalyst particles not greater than about 0.001 times the diameter of the particles of said dispersing fraction, withdrawing the stream of effluent reaction products, separating catalyst particles therefrom, and conducting said reactant stream upwardly through the reaction zone with sufficient of said fine catalyst particles suspended therein and at a linear velocity such that said coarse dispersing particles are maintained in vibratory motion effective to interrupt discontinuity of contact between the reactants and the fine catalyst particles in the reaction zone and maintain the catalyst in a state of substantially uniform fluidization at high bed density throughout the vertical extent thereof with the reactants dispersed throughout the particle mass.

2. The method according to claim 1 wherein the particles of said dispersing fraction have a diameter within the range of about 0.1 to 0.2 times the diameter of a tube having an hydraulic radius equal to that of the reaction zone.

3. The method according to claim 1 wherein the hydraulic radius of said reaction zone is not greater than about one-half inch.

4. In the catalytic conversion of gaseous reactants by contact with a solid particle catalyst, the improvement which comprises effecting said contact by passing a stream of said reactant gas upwardly through a reaction zone comprising a relatively constricted, vertically extending passageway having an hydraulic radius not greater than about one inch, and occupied by a relatively coarse dispersing fraction, consisting of solid particles having a substantially uniform diameter within the range of about 0.05 to 0.35 times the diameter of a tube of hydraulic radius equal to that of said reaction zone, and a relatively fine catalytic fraction, consisting of catalyst particles not greater than about 0.1 times the diameter of the particles of said dispersing fraction, withdrawing the effluent reaction products from the upper part of said reaction zone, separating catalyst particles therefrom, and conducting said reactant stream upwardly through the reaction zone with sufficient of said fine catalytic particles suspended therein and at a linear velocity such that said coarse dispersing particles are maintained in vibratory motion effective to interrupt discontinuity of contact between the reactants and the fine catalyst particles in the reaction zone and maintain the catalyst in a state of substantially uniform fluidization at high bed density throughout the vertical extent thereof with the reactants dispersed throughout the particle mass.

5. The method according to claim 4 wherein said catalytic fraction consists of particles not greater than about 0.001 times the diameter of the particles of said dispersing fraction.

6. The method according to claim 4 wherein the catalyst particles separated from the upper part of said reaction zone are continuously reinjected into said reaction zone with the stream of reactant gas.

CLAUDE W. WATSON.

REFERENCES CITED

The following references are of record in the file of this patent:

UNITED STATES PATENTS

| Number | Name | Date |
| --- | --- | --- |
| 2,347,682 | Gunness | May 2, 1944 |
| 2,360,787 | Murphree et al. | Oct. 17, 1944 |
| 2,376,564 | Upham et al. | May 22, 1945 |
| 2,393,636 | Johnson | Jan. 29, 1946 |
| 2,393,909 | Johnson | Jan. 29, 1946 |
| 2,396,109 | Martin | Mar. 5, 1946 |
| 2,417,164 | Huber, Jr. | Mar. 11, 1947 |
| 2,443,673 | Atwell | June 22, 1948 |